United States Patent [19]

Ichikawa et al.

[11] Patent Number: 4,839,029

[45] Date of Patent: Jun. 13, 1989

[54] PROCESS FOR REMOVING ARSENIC FROM A PETROLEUM FRACTION

[75] Inventors: Shinichi Ichikawa; Unkichi Yoshida; Yoshihisa Matsushima; Hisatake Hashimoto, all of Kanagawa, Japan

[73] Assignee: Tonen Sekiyu Kagaku Kabushiki Kaisha, Tokyo, Japan

[21] Appl. No.: 146,168

[22] PCT Filed: Apr. 22, 1987

[86] PCT No.: PCT/JP87/00257

§ 371 Date: Dec. 23, 1987

§ 102(e) Date: Dec. 23, 1987

[87] PCT Pub. No.: WO87/06604

PCT Pub. Date: Nov. 5, 1987

[30] Foreign Application Priority Data

Apr. 23, 1986 [JP] Japan ................................. 61-95680

[51] Int. Cl.$^4$ .............................................. C10G 25/00
[52] U.S. Cl. ................................. 208/251 R; 208/293; 208/299; 208/300; 585/822
[58] Field of Search ............... 208/293, 299, 300, 306, 208/251 R; 585/822; 423/87

[56] References Cited

U.S. PATENT DOCUMENTS

| 3,542,669 | 11/1970 | De Feo | 208/91 |
|---|---|---|---|
| 3,804,750 | 4/1974 | Myers et al. | 208/251 H |
| 3,856,664 | 12/1974 | Whitehurst | 208/251 R |
| 3,954,603 | 5/1976 | Curtin | 208/251 H |
| 4,046,674 | 9/1977 | Young | 208/251 H |
| 4,069,140 | 1/1978 | Wunderlich | 208/251 H |
| 4,136,021 | 1/1979 | Whitehurst | 208/251 R |
| 4,181,596 | 1/1980 | Jensen | 208/251 R |
| 4,227,995 | 10/1980 | Sze et al. | 208/251 H |
| 4,376,015 | 3/1983 | Spars | 208/251 R |
| 4,439,313 | 3/1984 | Schindler et al. | 208/251 H |
| 4,518,490 | 5/1985 | Fish | 208/251 R |
| 4,534,855 | 8/1985 | Silverman | 208/251 H |
| 4,551,237 | 11/1985 | Fenton | 208/293 |
| 4,604,191 | 8/1986 | Fish | 208/251 R |
| 4,659,684 | 4/1987 | Fish | 208/251 R |

FOREIGN PATENT DOCUMENTS 1450321  9/1982  Japan .
170987  10/1982  Japan .
170988  10/1982  Japan .

Primary Examiner—Helen M. S. Sneed
Assistant Examiner—Helane Myers
Attorney, Agent, or Firm—Wenderoth, Lind & Ponack

[57] ABSTRACT

In the present invention, a petroleum fraction containing arsenic is brought into contact with an adsorbent comprising a substrate such as an active carbon, bituminous coal or organic polymeric compound having introduced therein a sulfur element, particularly represented by mercapto moiety, and therefore arsenic in the petroleum fraction can be removed at a high percent removal by means of simple equipment, and, even if highly reactive olefins are contained in the petroleum fraction, these olefins do not polymerize, thus troubles do not occur.

5 Claims, No Drawings

PROCESS FOR REMOVING ARSENIC FROM A PETROLEUM FRACTION

TECHNICAL FIELD

This invention relates to a process for removing arsenic from a petroleum fraction and, more particularly, to a process for efficiently removing arsenic from particularly a light petroleum fraction such as naphtha.

BACKGROUND ART

If arsenic (As) is contained in petroleum fractions such as straight run naphtha, kerosene and fractions formed by catalytic cracking or the like, in producing petrochemical starting materials such as ethylene or petrochemical products such a polymers from the petroleum fraction using a catalyst, the poisoning of the catalyst by arsenic will occur and the catalytic activity will be rapidly reduced or coking will be accelerated in the pyrolysis of the petroleum fractions. Particularly, when noble metals such as Pt and Pd are used as catalysts, the catalysts can be significantly and adversely affected even if arsenic is present in a minor amount. It is highly desired that arsenic is removed from petroleum fractions such as straight run naphtha to a specific amount or below.

Various processes for removing arsenic from a petroleum fraction have been known in the prior art. Such processes include a process wherein a petroleum fraction is subjected to hydrodesulfurization treatment to remove arsenic together with sulfur. According to this process, arsenic is removed together with sulfur. However, when the removal of arsenic is desired, the installation cost and running cost are increased. Further, the process is unsuitable for feed naphtha having a small arsenic content for steam cracker. There have been proposed another process wherein a petroleum fraction is brought into contact with an alkali metal or alkaline earth metal, and a further process wherein a petroleum fraction is brought into contact with a nitrogen containing compound having three substituted moieties and one unpaired electron or a lignite active carbon. However, these processes have such problems that the dearsination ability is low and a large amount of a dearsinating agent is required.

Further, there has been proposed a process wherein arsenic contained in a petroleum fraction is directly oxidized with an oxidizing agent such as an organic peroxide to form heavy products and such heavy products are distilled and separated. However, when highly reactive olefins are contained in the petroleum fraction, these olefins may be polymerized or oxidized to cause troubles.

There has been known a further process wherein arsenic contained in a petroleum fraction is brought into contact with a copper impregnated active carbon to remove arsenic. However, this process has such problems that this copper impregnated active carbon is expensive and the percent removal of arsenic is not always satisfactory.

We have carried out studies in order to overcome such problems and to efficiently remove arsenic from a petroleum fraction. We have now found that, when the petroleum fraction is brought into contact with a specific adsorbent, arsenic can be efficiently removed. The present invention has been completed on the basis of such a discovery.

The present invention is intended to overcome the problems associated with the prior art as described above. An object of the present invention is to provide a process for removing arsenic from a petroleum fraction, wherein arsenic which is a poison for catalyst can be easily and efficiently removed from the petroleum fraction and wherein even if highly reactive olefins are contained in the petroleum fraction these olefins are not polymerized in the course of the removal of arsenic, thus no troubles occur.

DISCLOSURE OF INVENTION

A process for removing arsenic in a petroleum fraction according to the present invention comprises contacting the petroleum fraction containing arsenic with an adsorbent, said adsorbent comprising a substrate such as an active carbon, bituminous coal or organic polymeric compound having introduced thereinto a sulfur element in the form as represented by a mercapto moiety.

In the present invention, the petroleum fraction containing arsenic is brought into contact with the adsorbent comprising the substrate such as the active carbon, bituminous coal or organic polymeric compound having introduced thereinto the sulfur element particularly represented by the mercapto moiety. Accordingly arsenic in the petroleum fraction can be removed at a high percent removal by means of simple equipment, and, even if highly reactive olefins are contained in the petroleum fraction, these olefins are not polymerized, thereby troubles can be avoided.

While it has been heretofore known that polymeric compounds having an aromatic moiety or compounds obtained by introducing a mercapto moiety into a vinyl chloride resin adsorb heavy metals such as mercury, cadmium, chromium, lead and arsenic contained in wastewater it has not been known at all that the adsorbent specified by the present invention can easily remove arsenic in the petroleum fraction at a high percent removal without any troubles, i.e., without polymerizing highly reactive olefins even if these olefins are contained in the petroleum fraction.

BEST MODE FOR CARRYING OUT THE INVENTION

A process for removing arsenic in a petroleum fraction according to the present invention will be fully described hereinafter.

Petroleum Fraction

Petroleum fraction from which arsenic is to be removed in the present invention includes fractions such as straight run naphtha (obtained as directly distilled off from crude oils), kerosene, gas oil and vacuum gas oil; light fractions formed by heat treatment in ethylene plants, cokers, visbreakers or the like; and light fractions formed by fluid catalytic cracking treatment. Further, in the present invention, relatively light fractions such as condensate (NGL) can be used as the petroleum fractions.

Arsenic is usually contained in such petroleum fractions in the form of hydrides or organic compounds as represented by the formula $RnAsH_{3-n}$ wherein R is an alkyl or phenyl moiety, etc. and n is 0, 1, 2 or 3. Example of such arsenic compounds include arsine, monomethylarsine, dimethylarsine, trimethylarsine, tributylarsine, and triphenylarsine. Arsenic can also be contained in the petroleum fractions in the form of halogenated arsenic compounds such as dimethylchloroarsine or oxidized arsenic compounds such as trimethylarsine oxide.

While the kind of arsenic compound can be varied depending upon the type of the petroleum fractions, arsenic is generally contained in the petroleum fractions at a level of from several ppb (by weight) to hundreds of ppb (by weight) in many cases.

In order to accurately analyze the amount of arsenic contained in such petroleum fractions, for example the following method found by us can be utilized.

That is, it is possible to utilize a method Wherein an oxidizing agent and an acid are added to a petroleum fraction containing an organoarsenic compound to convert said organoarsenic compound to an arsenic oxide; the resulting arsenic oxide is then reduced to form an arsenic hydride; this arsenic hydride is heated to form an arsenic atom; and the amount of arsenic atom is determined by an atomic absorption method.

In the method, the organoarsenic compound contained in the petroleum fraction is oxidized to form the arsenic oxide, the arsenic oxide is then reduced to form the arsenic hydride and thereafter the quantitative analysis is carried out by the atomic absorption method. Accordingly, the quantitative analysis of arsenic can be carried out within an extremely short period of time with good precision and reproducibility. Further, an oxyhydrogen flame or the like is not used and therefore the safety is extremely high. Furthermore, an extremely minor amount of arsenic can also be analyzed.

The method of analyzing arsenic in the petroleum fraction as described above will be fully described.

An organoarsenic compound contained in a petroleum fraction is relatively high in its vapor pressure and liable to be volatilized by heating. Accordingly, it is necessary to carry out pretreatment before analysis of arsenic.

First, an oxidizing agent and an acid are added to the petroleum fraction containing the organoarsenic compound to oxidize and decompose the organoarsenic compound to form an arsenic oxide, and this arsenic oxide is extracted in an aqueous phase.

Such oxidizing agents for use herein include hydrogen peroxide, potassium bichromate, potassium oxalate, potassium permanganate, nitric acid and organic peroxides.

When aqueous hydrogen peroxide is used as the oxidizing agent, it is desirable that its concentration is of the order of from 10% to 30% by weight.

The acids for use herein include sulfuric acid, hydrochloric acid and nitric acid.

It is preferable that the acid added has a high concentration, i.e. at least 50% by weight.

In oxidizing and decomposing the organoarsenic compound contained in the petroleum fraction to form the arsenic oxide, the above oxidizing agent such as aqueous hydrogen peroxide is preferably first added to the petroleum fraction, and then to the resulting mixture is added a mixture of the oxidizing agent and the acid, e.g., a mixture of aqueous hydrogen peroxide and sulfuic acid. Alternatively, a mixture of an oxidizing agent and an acid can also be directly added to the petroleum fraction.

As the organoarsenic compound in the petroleum fraction is thus oxidized and decomposed, the organoarsenic compound Will be converted to a arsenic oxide as shown in the following formula:

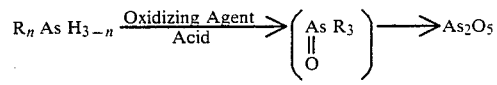

While the amount of a petroleum fraction sample used in carring out the quantitative analysis of arsenic can be largely varied depending upon the content of arsenic, it is generally of the order of from 5 to 100 ml. For example, when 500 wt ppb of arsenic is contained in the petroleum fraction, 5 ml of the sample is sufficient. When the content of arsenic is 100 wt ppb, from 20 to 25 ml of the sample is used. When the content of arsenic is from 20 to 50 wt ppb, from 30 to 50 ml of the sample is used. When the content of arsenic is from 2 to 10 wt ppb, about 100 ml of the sample is used.

It is preferable to heat the reaction system to a refluxing temperature during the oxidation/decomposition of the organoarsenic compound contained in the petroleum fraction as described above or after oxidation/decompositon. By thus heating, hydrocarbons in the sample are decomposed or evaporated and removed, and the resulting arsenic oxide is transferred to an aqueous phase. During this time, even if excess oxidizing agents such as hydrogen peroxide are present in the reaction system, they are decomposed. If the oxidizing agents such a hydrogen peroxide remain in the aqueous phase in the atomic absorption analysis described hereinafter, the quantitative analysis of arsenic is adversely affected. Therefore, the residual oxidizing agents are undesirable for the atomic absorption analysis.

In some cases, a portion of the petroleum fraction is carbonized during the heating step. In the case of such petroleum fractions, a large amount of the oxidizing agent such as hydrogen peroxide can be used to decompose the carbonized petroleum fraction, thereby removing it.

The arsenic oxide obtained by oxidizing as described above is then reduced to form an arsenic hydride. It is believed that the reduction of the arsenic oxide to the arsenic hydride proceeds as shown in the following formula:

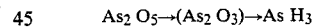

The reduction of the arsenic oxide to the arsenic hydride is preferably carried out by adding sodium boron hydride to the reaction system. The sodium boron hydride is also preferably added to the reaction system in the form of an aqueous solution. During this time, acids such as hydrochloric acid are preferably added to the aqueous solution to acidify it. It is also preferable that the concentration of the aqueous sodium boron hydride solution is of the order of from 1% to by weight. Further, sodium boron hydride is used in an excess amount relative to the arsenic oxide to be reduced.

In the reduction of the arsenic oxide by sodium boron hydride as described above, the coexistence of potassium iodide in the reaction system promotes the reduction of arsenic (V) oxide to arsenic (III) oxide, and the sensitivity of the analysis of arsenic is improved. The potassium iodide is present in the reaction system at a level of from 0.1% to 10% by weight, preferably from 0.5% to 5% by weight.

After the organoarsenic compound in the petroleum fraction is thus converted to the arsenic hydride (AsH$_3$).

this arsenic hydride is heated to form an arsenic atom and this arsenic atom is subjected to quantitative analysis by an atomic absorption analysis method.

In heating the arsenic hydride to form the arsenic atom, the arsenic hydride is heated to a conventional temperature used in the prior art heating/atomization method of the arsenic hydride, e g , to a temperature of the order of from about 800° C. to 1,100° C. by means of commercially available hydride atomization apparatus. The quantitative analysis of the resulting arsenic atom by the atomic absorption analysis can be carried out by means of commercially available atomic absorption apparatus. The conditions or the like used in such steps can be conventional conditions utilized in the prior art atomic absorption analysis of arsenic.

Adsorbent

In the present invention, the petroleum fraction having arsenic is brought into contact with an adsorbent comprising a substrate such as an active carbon, bituminous coal or organic polymeric compound having introduced thereinto a sulfur element which is in the form as represented by a mercapto moiety.

The active carbon as the substrate which is a base for such an adsorbent is used in the form of powder or granule. It is desirable that its specific surface area is from 200 to 2,000 square meters per gram, preferably from 500 to 1,500 square meters per gram.

The bituminous coal as the substrate is used in the form of powder or granule as with the active carbon.

The organic polymeric compounds as the substrate are polystyrene, styrene-divinylbenzene copolymers, polyvinyl chloride, phenolic resins, cellulose or mixture thereof. Of the above, particularly preferred substrate is the active carbon.

While the sulfur element in these substrates is introduced in the form as represented by a mercapto moiety, it may be introduced in the form of moieties such as thioethers, thioaldehydes, thiocarboxylic acids, dithiocarboxylic acids, thioamides, and thiocyanates.

In order to introduce the sulfur element in the form as represented by the mercapto moiety, into the substrate, for example, a process as described in Japanese Patent Publication No.45924/1981 can be utilized. That is, the substrate may be chloromethylated and thereafter reacted with an alcoholic alkali hydrosulfide. Alternatively, the substrate may be chlorosulfonated and thereafter the introduced chlorosulfone moiety may be reduced. Further, in the case of the cellulose substrate, a method as described in Japanese Patent Publication No. 15554/1977 can also be utilized It is believed that, When the adsorbent comprising the substrate having the sulfur element introduced thereinto is used for removing arsenic, the reason why the removal efficiency of arsenic is improved as compared with the adsorbent having no sulfur element introduced resides in the fact that sulfur in the adsorbent acts as a donor. It is also believed that, particularly when the active carbon is used as the substrate the adsorption reaction by the active carbon occurs and therefore the removal efficiency of arsenic is enhanced.

Contact Condition

The contact of the petroleum fraction containing arsenic with the adsorbent can be carried out by optional methods known in the prior art. For example, it is possible to utilize a method wherein the petroleum fraction containing arsenic is brought into contact with the adsorbent in a liquid phase state in a fixed bed system; another method wherein the petroleum fraction containing arsenic is brought into contact with the adsorbent in a liquid phase state in a moving bed system; and a further method Wherein the petroleum fraction containing arsenic is brought into contact with the adsorbent in a liquid phase state in a fluidized bed system. Further optionally, the petroleum fraction can be brought into contact with the adsorbent in a batch system.

The contact of the petroleum fraction with the adsorbent is carried out at a liquid hourly space velocity (L. H. S. V.) of the order of from 0.01 to 20 $hr^{-1}$, preferably from 1 to 10 $hr^{-1}$. The temperature during the contact is of the order of from 0° C. to 100° C.

Effect of the Invention

In the present invention, the petreoleum fraction containing arsenic is brought into contact with the adsorbent comprising the substrate such as active carbon, bituminous coal or organic polymeric compound having introduced thereinto the sulfur element which is in the form as represented particularly by the mercapto moiety. Accordingly, arsenic in the petroleum fraction can be removed at a high percent removal by means of simple equipment.

That is, in order to remove arsenic from the petroleum fraction containing arsenic by the present invention, pretreatment installation and posttreatment installation other than strainers are unnecessary Moreover, even if highly reactive olefins are contained in the petroleum fraction, these olefins will not be polymerized and thus no troubles will occur.

While the present invention is illustrated by Examples, it is not limited thereto.

EXAMPLE 1

First, according to the process described in Japanese Patent Laid-open Publication No. 117585/1974, mercapto moieties were introduced into a coconut husk active carbon as described hereinafter. That is, 90 ml of chloromethyl ether and 30 grams of tetrachloroethane were added to 30 grams of the coconut husk active carbon, and the resulting mixture was allowed to stand for 30 minutes at room temperature. Thirty grams of aluminum chloride anhydride were then gradually added at a temperature of from 0° C. to 5° C. over about two hours to carry out the chloromethylation of the active carbon. After the reaction, water was gradually added into the resulting mixture kept in an ice bath to hydrolyze the unreacted material. The resulting chloromethylated active carbon was separated from the aqueous phase, sequentially throughly washed with water and acetone, and thereafter dried.

To 30 grams of the resulting dried chloromethylated active carbon were added 100 ml of ethanol and 200ml of a 20% aqueous potassium hydrosulfide solution, and the reaction mixture was reacted for 3 hours at room temperature. The resulting mercapto moiety-containing compound was repeatedly Washed with 1 mole/liter of ammonium hydroxide until the basicity substantially disappeared. The resulting active carbon having mercapto moieties contained 0.19% by weight of sulfur.

A column having a diameter of 8 mm and a length of 100 mm was packed with 5 ml of the thus obtained active carbon having mecapto moieties Light naphtha containing 36 ppb (by weight) of arsenic was passed through the column at a liquid hourly space velocity (L.H.S.V.) of 10 hr$^{-1}$.

When the total throughput was 4,000 liters per liter of the adsorbent, the thus treated light naphtha contained 5 ppb (by weight) of arsenic. The percent removal of arsenic was 86%.

COMPARATIVE EXAMPLE 1

The arsenic removal procedure Was carried out as in Example 1 except that a coconut husk active carbon having no mercapto moieties introduced thereinto was used as an adsorbent.

When the total throughput was 4,000 liters per liter of adsorbent, the thus treated light naphtha contained 12 ppb (be weight) of arsenic, and the percent removal of arsenic was 67%.

EXAMPLE 2

In Example 1, the coconut husk active carbon was replaced with a high porous polymer (polystyrene type polymer available from Mitubishi Kasei, K K. under the tradename Dia Ion HP-10), and mercapto moieties were introduced into this polymer as in Example 1. Arsenic in light naphtha containing 36ppb of arsenic as removed as in Example 1 using the resulting high porous polymer having mercapto moieties introduced thereinto.

Until the total throughput reached 3,000 liters per liter of adsorbent, 80% of arsenic was removed.

COMPARATIVE EXAMPLE 2

40 ml of a high porous polymer having no mercapto moieties introduced thereinto was contacted and mixed with 400 ml of a light naphtha containing 440 ppb of arsenic for one hour to remove arsenic in the light naphtha.

The thus treated light naphtha contained 420 ppb of arsenic, and the percent removal of arsenic was 4.5%.

COMPARATIVE EXAMPLE 3

A coconut husk active carbon having no mercapto moieties introduced thereinto was impregnated with copper to prepare a copper impregnated active carbon which has been heretofore used in removing arsenic from petroleum fractions 40 ml of this copper impregnated active carbon was contacted and mixed with 400 ml of a light naphtha containing 440 ppb of arsenic for one hour to remove arsenic in the light naphtha.

The thus treated light naphtha contained 170 ppb of arsenic, and the percent removal of arsenic was 61%.

EXAMPLE 3

The adsorbent produced in Example 1 was used, and 1,000 ppb (by weight) of tributylarsine was added to a China naphtha containing 220 ppb (by weight) of arsenic. A test for adsorbing arsenic was carried out at an L. H. S. V. of 5 hr$^{-1}$ and at room temperature. The results are shown in Table 1.

TABLE 1

| Feed Naphtha | Total Throughput (liter of naphtha/ liter of adsorbent) | Percent Removal of Arsenic (%) |
|---|---|---|
| Tributylarsine added | 700 | >99 |

EXAMPLE 4

A test was carried out under the same conditions as those descried in Example 3 except that the adsorbent produced in Example 2 was used. The results are shown in Table 2.

TABLE 2

| Feed Naphtha | Total Throughput (liter of naphtha/ liter of adsorbent) | Percent Removal of Arsenic (%) |
|---|---|---|
| Tributylarsine added | 700 | >99 |

The following Reference Examples describe an analysis of arsenic in a petroleum fraction.

REFERENCE EXAMPLE 1

20 ppb (by weight) of triphenylarsine was added as an organoarsenic compound to 100 ml of a light naphtha which was substantially free of an organoarsenic compound. To this light naphtha Were added 20ml of 31% aqueous hydrogen peroxide and 30 ml of 18N sulfuric acid to oxidize and decompose arsenic to form an arsenic oxide and to remove hydrocarbons in the naphtha. Further, this reaction mixture was heated for about 10 minutes at the refluxing temperature of water to decompose the residual excess hydrogen peroxide.

To the thus obtained aqueous solution containing the arsenic oxide was added 5 ml of a 40% by weight aqueous potassium iodide solution, and the resulting mixture was allowed to stand for about 30 minutes. Thereafter, this aqueous solution and the same volume of a 2% by weight aqueous sodium boron hydride solution were each individually introduced into a hydride generation apparatus (HYD-1 manufactured by Nippon Jourrel Ash) to reduce the arsenic oxide to arsenic hydride ($AsH_3$).

The thus obtained arsenic hydride $AsH_3$ was introduced into a commercially available hydride atomization apparatus (HYD-2 manufactured by Nippon Jourrel Ash), and arsenic hydride was decomposed at an atomizer temperature of 1,000° C. to form an arsenic atom. The thus obtained arsenic atom was introduced into a commercially available atomic absorption apparatus (AA-8200 manufactured by Nippon Jourrel Ash), and arsenic was determined from the absorbance of an atomic absorption photometer at 193.7 mm.

The quantitative analysis procedure of arsenic as described above Was completed in about 2 hours.

This procedure was repeated 20 times to examine the analysis precision and reproducibility.

The results are shown in Table 3.

TABLE 3

| No. | Analyzed Arsenic Concentration (wt ppb) | No. | Analyzed Arsenic Concentration (wt ppb) |
|---|---|---|---|
| 1 | 19.5 | 11 | 20.5 |
| 2 | 21.5 | 12 | 21.5 |
| 3 | 20.5 | 13 | 19.0 |
| 4 | 21.5 | 14 | 21.5 |
| 5 | 19.5 | 15 | 19.5 |
| 6 | 21.5 | 16 | 21.5 |
| 7 | 20.0 | 17 | 20.0 |
| 8 | 19.0 | 18 | 20.5 |
| 9 | 20.5 | 19 | 19.0 |
| 10 | 21.5 | 20 | 21.5 |

As can be seen from these results, the reproducibility of quantitative analysis of arsenic is very good, and the analysis precision is also good.

REFERENCE EXAMPLE 2

The concentration of arsenic in petroleum fractions was analyzed as in Reference Example 1 using 100 ml of various petroleum fractions containing organoarsenic compounds having various concentrations as shown in Table 4.

The results are shown in Table 4.

REFERENCE COMPARATIVE EXAMPLE 1

100 ml of the same various petroleum fractions as those used in Reference Example 2 were burnt in an oxyhydrogen flame, and arsenic adhered to the wall surface of a combustion chamber was washed With hydrochloric acid. Thereafter, arsenic Was absorbed into aqueous hydrogen peroxide. To this solution was then added magnesium nitrate and the mixture was evaporated to dryness. To this was added a 1% aqueous nitric acid solution. The resulting solution was introduced into an atomic absorption photometer to carry out the quantitative analysis of arsenic The results are shown in Table 4.

From one and one half to two days were required for such a quantitative analysis of arsenic.

TABLE 4

|  | Analysis Value obtained by Example 2 (ppb) | Analysis Value obtained by Comparative Example 1 (ppb) |
| --- | --- | --- |
| Light Naphtha-1 | 150 | 170 |
| Light Naphtha-2 | 51 | 47 |
| Heavy Naphtha-1 | 530 | 510 |
| Heavy Naphtha-2 | 10 | 9 |

TABLE 4-continued

|  | Analysis Value obtained by Example 2 (ppb) | Analysis Value obtained by Comparative Example 1 (ppb) |
| --- | --- | --- |
| Kerosene | 170 | 190 |

Industrial Applicability

According to the process for removing arsenic in the petroleum fraction of the present invention, arsenic in the petroleum fraction can be removed at a high percent removal by means of simple equipment. Even if highly reactive olefins are contained in the petroleum fraction, these olefins are not polymerized. Accordingly, arsenic in the petroleum fraction can be surely removed, and even if the arsenic-removed petroleum fraction is brought into contact with a catalyst, the catalyst will not be poisoned.

What is claimed is:

1. A process for removing arsenic in a petroleum fraction which comprises the step of contacting the petroleum fraction containing arsenic in the form of arsine or an organic arsine compound with an adsorbent comprising a substrate having a sulfur element introduced thereinto, said sulfur element being in the form of mercapto moieties, thioethers, thioaldehydes, thiocarboxylic acids, dithiocarboxylic acids, thioamides or thiocyanates.

2. The process according to claim 1 wherein the substrate of the adsorbent is an active carbon, a bituminous coal, or an organic polymeric compound.

3. The process according to claim 1 wherein the sulfur element is introduced in the form of mercapto moieties.

4. The process according to claim 2 wherein the substrate is polystyrene, a styrene-divinylbenzene copolymer, polyvinyl chloride, a phenolic resin, cellulose or a mixture thereof.

5. A process according to claim 1 wherein the petroleum fraction to be contacted with the adsorbent contains an olefin.

* * * * *